US010336306B2

(12) United States Patent
Call

(10) Patent No.: US 10,336,306 B2
(45) Date of Patent: Jul. 2, 2019

(54) CONTROL SYSTEM FOR AUTOMATIC PARKING BRAKE OF RAIL VEHICLE

(71) Applicant: New York Air Brake, LLC, Watertown, NY (US)

(72) Inventor: Derick Call, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 63 days.

(21) Appl. No.: 15/426,619

(22) Filed: Feb. 7, 2017

(65) Prior Publication Data

US 2018/0222465 A1    Aug. 9, 2018

(51) Int. Cl.
*B60T 15/18* (2006.01)
*B60T 15/04* (2006.01)
*B60T 15/02* (2006.01)
*B60T 17/08* (2006.01)
*B60T 17/16* (2006.01)
*F15B 15/26* (2006.01)

(52) U.S. Cl.
CPC .......... *B60T 15/048* (2013.01); *B60T 15/021* (2013.01); *B60T 15/041* (2013.01); *B60T 17/085* (2013.01); *B60T 17/16* (2013.01); *F15B 15/26* (2013.01)

(58) Field of Classification Search
CPC ..... B60T 15/048; B60T 15/021; B60T 15/041
See application file for complete search history.

(56) References Cited

U.S. PATENT DOCUMENTS

| 3,208,801 | A | * | 9/1965 | McClure | ............... B60T 15/048 303/36 |
| 3,910,639 | A | * | 10/1975 | Engle | ..................... B60L 3/108 303/15 |
| 4,052,110 | A | * | 10/1977 | Banker | ................. B60T 13/665 303/36 |
| 4,076,322 | A | * | 2/1978 | Banker | ................. B60T 13/665 303/1 |
| 4,598,953 | A | * | 7/1986 | Wood | ................... B60T 13/665 303/122.15 |
| 4,799,741 | A | * | 1/1989 | Engle | ..................... B61H 13/02 303/60 |

(Continued)

FOREIGN PATENT DOCUMENTS

| WO | 2013/181707 | 12/2013 |
| WO | 2016/018215 | 2/2016 |

OTHER PUBLICATIONS

Nternational Search Report Form PCT/ISA/220, International Application No. PCT/US2017/016835, pp. 1-12, dated Nov. 13, 2017.

Primary Examiner — Bradley T King
Assistant Examiner — James K Hsiao
(74) Attorney, Agent, or Firm — Bond Schoeneck and King PLLC; David Nocilly

(57) ABSTRACT

A control valve for an automatic parking brake having an inlet for coupling to a source a brake pipe pressure, an outlet for coupling to a control inlet of the automatic parking brake and a pilot for coupling to the source of brake pipe pressure. The control valve is moveable between a first position where the inlet is in communication with the outlet and a second position where the inlet and the outlet are isolated from each other in response to a predetermined amount of brake pipe pressure at the pilot. The control valve includes a spring biasing the control valve into the first position.

12 Claims, 2 Drawing Sheets

(56) References Cited

U.S. PATENT DOCUMENTS

Figure 1:
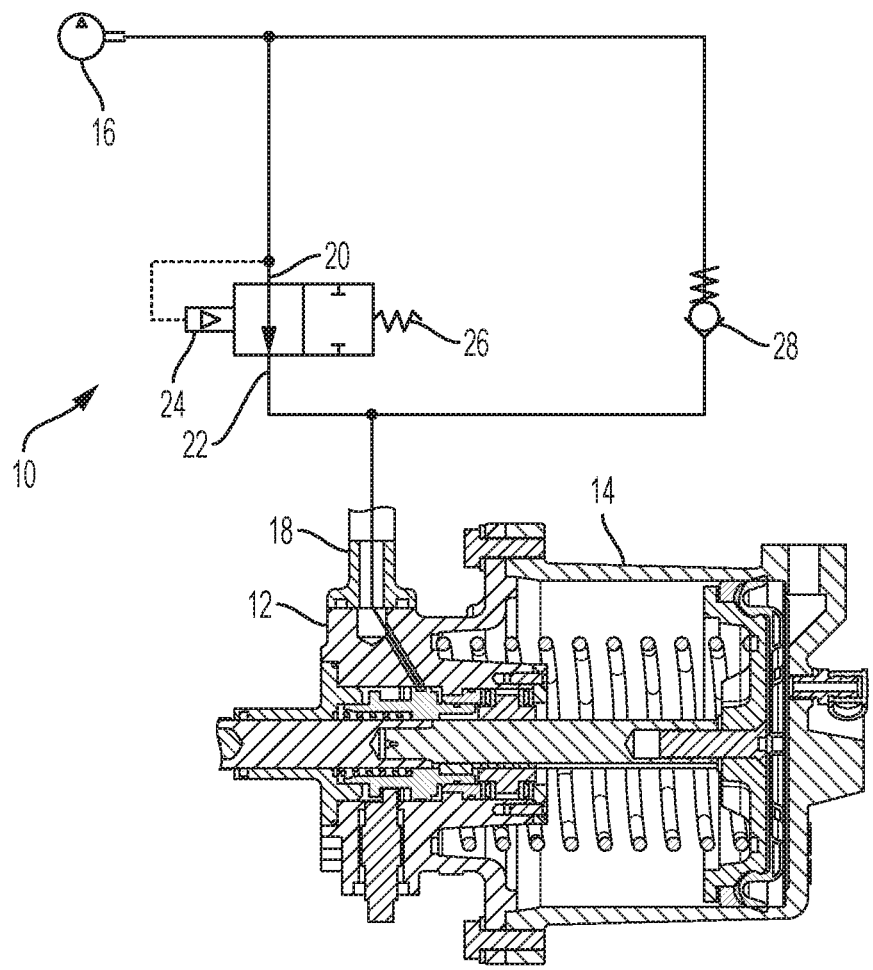

| | | | | |
|---|---|---|---|---|
| 5,056,873 | A * | 10/1991 | Deno | B60T 17/228 |
| | | | | 303/20 |
| 5,222,788 | A * | 6/1993 | Dimsa | B60T 13/665 |
| | | | | 303/15 |
| 5,494,342 | A * | 2/1996 | Engle | B60T 13/585 |
| | | | | 303/15 |
| 5,788,338 | A * | 8/1998 | Hart | B60T 13/665 |
| | | | | 303/15 |
| 5,984,426 | A * | 11/1999 | Hart | B60T 13/665 |
| | | | | 303/15 |
| 6,325,464 | B2 * | 12/2001 | Truglio | B60T 13/665 |
| | | | | 303/15 |
| 6,491,352 | B2 * | 12/2002 | Engle | B61H 13/005 |
| | | | | 188/107 |
| 6,561,595 | B2 * | 5/2003 | Vaughn | B60T 8/1843 |
| | | | | 303/22.1 |
| 6,578,679 | B2 * | 6/2003 | Hill | B60T 13/665 |
| | | | | 188/107 |
| 6,685,281 | B2 * | 2/2004 | MacGregor | B60T 7/10 |
| | | | | 303/123 |
| 6,729,696 | B2 | 5/2004 | Kemer et al. | |
| 8,006,815 | B2 | 8/2011 | Sommerfeld et al. | |
| 2016/0023645 | A1 * | 1/2016 | Wright | B60T 15/184 |
| | | | | 303/66 |
| 2016/0082939 | A1 * | 3/2016 | Cole | B60T 13/665 |
| | | | | 303/8 |

* cited by examiner

CONTROL SYSTEM FOR AUTOMATIC PARKING BRAKE OF RAIL VEHICLE

BACKGROUND OF THE INVENTION

1. Field of the Invention

The present invention relates to automatic parking brakes for rail vehicles and, more specifically, to a control valve for controlling the release of automatic parking brakes.

2. Description of the Related Art

In order to avoid having to manually apply the brake on each rail car in a train to accomplish a parking brake function, automatic parking brakes having been developed that automatically retain the brake cylinder in a fully applied position if the brake pipe pressure is exhausted below a predetermined threshold. For example, a conventional parking brake system is the Parkloc® system available from New York Air Brake, LLC of Watertown, N.Y., which is additionally described in U.S. Pat. Nos. 7,163,090 and 7,377,370. The Parkloc® system uses a pneumatically controlled, mechanical locking mechanism to lock the air brake cylinder in the applied, loaded state. As a result, even if the air brake cylinder subsequently leaks away due to a long parking duration, the brakes are mechanically held in the applied position.

The latching mechanism in the Parkloc® system is piloted by brake pipe pressure and is arranged to lock when brake pipe pressure drops below a certain amount and unlock when the brake pipe exceeds a certain amount. The pressure at which Parkloc® system releases the brakes is a function of the amount of force that the Parkloc® system is retaining. More specifically, the more force that is being applied by the brake cylinder, the more friction there is between the structure of the locking mechanism and the brake cylinder. As a result, more brake pipe pressure is required to disengage the locking mechanism from the brake cylinder. For example, if the train was operating with a brake pipe (BP) pressure of 70 psi and the BP was vented to zero at service rate, the resulting brake cylinder pressure would be about 50 psi and represents the lowest amount of force that is retained. If a train was operating at a BP pressure of 110 psi and the BP vented to zero at an emergency rate, the resulting brake cylinder pressure would be about 94 psi. If the hand brake was then applied on top of the emergency brake application, the highest amount of retained force would result. The difference between the lowest amount of retained force and the highest amount of retained force is significant and causes a large variation in the BP pressure at which the Parkloc® system will release. As a result, when BP pressure is restored, all parking brakes will not necessarily release at the same time, which is an issue if the train is parked on a grade. Accordingly, there is a need for an improvement to an automatic parking brake system, such as the Parkloc® system or any other, that will ensure a more consistent and reliable release.

BRIEF SUMMARY OF THE INVENTION

The present invention ensures a more consistent and reliable release of an automatic parking brake with a control valve having an inlet for coupling to a source a brake pipe pressure, an outlet for coupling to a control inlet of the automatic parking brake and a pilot for coupling to the source of brake pipe pressure, wherein the control valve is moveable between a first position where the inlet is in communication with the outlet and a second position where the inlet and the outlet are isolated from each other in response to a predetermined amount of brake pipe pressure at the pilot. The control valve includes a spring biasing the control valve into the first position. The predetermined amount of brake pipe pressure required to move the control valve from the first position into the second position is preferably between 50 and 60 psi. A check valve having a cracking pressure of less than two psi may be coupled to the source of brake pipe pressure and the automatic parking brake control inlet in parallel with the control valve.

The present invention also includes a method of controlling an automatic parking brake, comprising the steps of providing a control valve having an inlet coupled to a source a brake pipe pressure, an outlet coupled to a control inlet of the automatic parking brake and a pilot coupled to the source of brake pipe pressure, moving the control valve into a first position that isolates the inlet from the outlet when the brake pipe pressure is above a predetermined amount; and moving the control valve into a second position the coupled the inlet and the outlet when the brake pipe pressure is above the predetermined amount. The control valve includes a spring biasing the control valve into the first position against any pressure at the pilot. The predetermined amount of brake pipe pressure is preferably between 50 and 60 psi. The method may also include the step of providing a check valve having a cracking pressure of less than two psi between the source of brake pipe pressure and the control inlet of the automatic parking brake in parallel with the control valve.

BRIEF DESCRIPTION OF THE SEVERAL VIEWS OF THE DRAWING(S)

Figure 2:
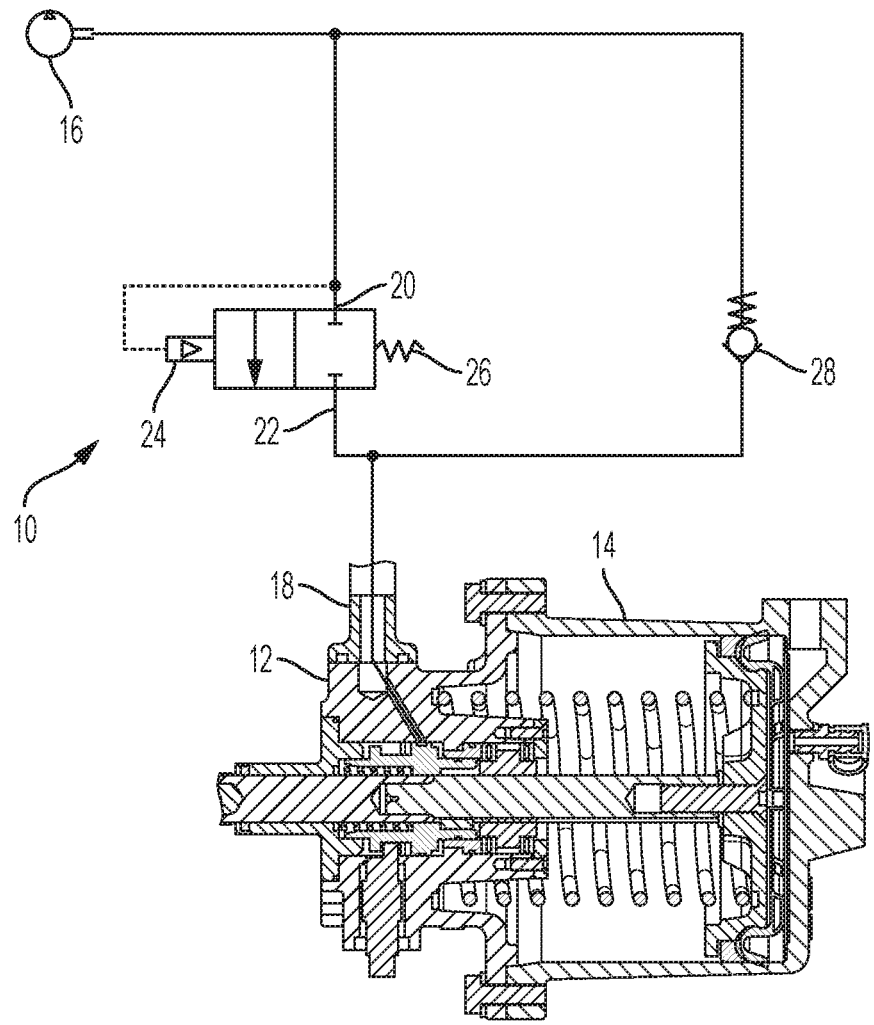

The present invention will be more fully understood and appreciated by reading the following Detailed Description in conjunction with the accompanying drawings, in which:

FIG. 1 is a schematic of a control valve for an automatic parking brake according to the present invention in a first position; and FIG. 2 is a schematic of a control valve for an automatic parking brake according to the present invention in a second position.

DETAILED DESCRIPTION OF THE INVENTION

Referring to the figures, wherein like numerals refer to like parts throughout, there is seen in FIG. 1 a control valve 10 for use with an automatic parking brake 12 that is coupled to a brake cylinder 14 for retaining the brake cylinder 14 in the brakes applied position when a train is to be parked, such as the Parkloc® system. Control valve 10 is positioned between the source of BP pressure 16, such as the brake pipe, that is used to control the automatic parking brake 12 and the control inlet 18 of automatic parking brake 12 that receives brake pipe pressure so that the parking brake 12 can respond thereto. Control valve 10 includes an inlet 20 in communication with the source of BP pressure 16 and an outlet 22 in communication with the BP pressure inlet 18 of automatic parking brake 12. Control valve 10 is moveable between a first position where inlet 20 is connected to outlet 22, and a second position where inlet 20 and outlet 22 are isolated from each other. Control valve 10 further includes a pilot 24 coupled to a source of BP pressure 16. Pilot 24 may be coupled to sources of pressure in addition to BP pressure 16, such as the emergency or auxiliary reservoir pressures (or combinations thereof), for additional functionality like delaying the release on the first railcar in a train due to the delay in charging of the various reservoirs at the rear of a train.

Pilot 24 is configured to urge control valve 10 from the first position to the second position against a biasing force, such as a spring 26. Spring 26 is configured to provide a predetermined amount of biasing force so that control valve will shuttle between the first and second positions when BP pressure 16 at pilot 24 is between 50 and 60 psi. A check valve 28 with a cracking pressure of less than 2 psi is positioned in parallel to control valve 10 between the source of BP pressure 16 and the BP pressure control inlet 18 of automatic parking brake 12. FIG. 1 illustrates control valve 10 in a released state, such as when BP pressure is fully charged, i.e., 90 psi in most locations. It should be recognized that the triggering pressures may be varied according to the system to adjust the timing of the locking and unlocking, or to account for the use of additional sources of pressure connected to pilot 24.

As seen in FIG. 2, when BP pressure is vented to, for example, 10 psi, control valve 10 will shuttle to the second position, thereby isolating the BP pressure inlet 18 of automatic parking brake 12 from the source of BP pressure 16. In the absence of BP pressure at inlet 18, inlet 18 will vent through check valve 28 so that the pressure drops to below 2 psi (as determined by the cracking pressure of check valve 28. As a result of the loss of pressure, the locking mechanism of automatic parking brake 12 will engage and lock brake cylinder 14. When BP pressure is recharged, control valve 10 will not shuttle back to the first position until the BP pressure at pilot 24 reaches the predetermined level set by spring 26, e.g., between 50 and 60 psi. As a result, the charging BP pressure remains isolated from automatic parking brake 12 until this point as no BP pressure is provided to the BP pressure inlet 18 of automatic parking brake 12 until control valve 10 returns to the first position. Automatic parking brake 12 will thus remain engaged until the BP pressure surpasses the predetermined level set by spring 26 and control valve 10 is shuttles to the first position as shown in FIG. 1. Thus, once BP pressure reaches the predetermined level, such as 50-60 psi, control valve 10 move into the first position to connect inlet 20 with outlet 22, thereby allowing BP pressure to flow to BP pressure control inlet 18 of automatic parking brake 12. As a result, the locking mechanism will be released of automatic parking brake 12. It should be recognized that a train having rail cars equipped with control valve 10 according to the present invention will release the locking mechanism of each parking brake of each rail car simultaneously as all automatic parking brakes 12 will not release until the predetermined level of BP pressure is reaches such that each control valve 10 of every rail car shuttles to the first position.

Control valve 10 may be used with any automatic parking brake 12 that engages in the absence of brake pipe pressure and disengages in response to recharging of the brake pipe, including the Parkloc® system. Control valve 10 may be used with any automatic parking brake 12, including those used on ABU type and truck mounted brake cylinders.

What is claimed is:

1. A system for controlling an automatic parking brake, comprising:

a control valve having an inlet for coupling to a source of brake pipe pressure, an outlet for coupling to a control inlet of the automatic parking brake, and a pilot directly coupled to the source of brake pipe pressure, wherein the control valve is moveable between a first position where the inlet is in communication with the outlet and a second position where the inlet and the outlet are isolated from each other in response to a predetermined amount of brake pipe pressure at the pilot; and a check valve having a cracking pressure and coupled to the source of brake pipe pressure and the automatic parking brake control inlet, wherein the check valve is in parallel with the control valve.

2. The system of claim 1, wherein the control valve includes a spring biasing the control valve into the second position.

3. The system of claim 2, wherein the predetermined amount of brake pipe pressure required to move the control valve from the first position into the second position is between 50 and 60 psi.

4. The system of claim 3, wherein the check valve has a cracking pressure of less than two psi.

5. The system of claim 4, further comprising a brake cylinder having the automatic parking brake installed therein, wherein the automatic parking brake is coupled to the outlet of the control valve by the control inlet.

6. The system of claim 5, further comprises a brake pipe coupled to the pilot and providing the source of brake pipe pressure.

7. A method of controlling an automatic parking brake, comprising the steps of:

providing a control valve having an inlet coupled to a source a brake pipe pressure, an outlet coupled to a control inlet of the automatic parking brake and a pilot directly coupled to the source of brake pipe pressure;

moving the control valve into a first position that isolates the inlet from the outlet when the brake pipe pressure is above a predetermined amount;

moving the control valve into a second position that coupled the inlet and the outlet when the brake pipe pressure is above the predetermined amount; and providing a check valve having a cracking pressure between the source of brake pipe pressure and the control inlet of the automatic parking brake, wherein the check valve is in parallel with the control valve.

8. The method of claim 7, wherein the control valves includes a spring biasing the control valve into the second position.

9. The method of claim 8, wherein the predetermined amount of brake pipe pressure is between 50 and 60 psi.

10. The method of claim 9, wherein the cracking pressure is less than two psi.

11. The method of claim 9, further comprising the step of coupling the control valve to a brake cylinder having the automatic parking brake installed therein by coupling the outlet of the control valve to the control inlet of the automatic parking brake.

12. The method of claim 11, further comprising the step of attaching a brake pipe to the pilot.

* * * * *